(12) United States Patent
Seo et al.

(10) Patent No.: US 10,926,354 B2
(45) Date of Patent: Feb. 23, 2021

(54) NEAR-INFRARED ABSORBING WHITE MATERIAL AND PREPARATION METHOD THEREOF

(71) Applicant: BUSEONG POLYCOM CO., LTD., Yangsan (KR)

(72) Inventors: Gu-won Seo, Sejong (KR); Dae-sung Yu, Changwon (KR); Bo-kyung Kim, Yangsan (KR)

(73) Assignee: BUSEONG POLYCOM CO., LTD., Yangsan (KR)

( * ) Notice: Subject to any disclaimer, the term of this patent is extended or adjusted under 35 U.S.C. 154(b) by 106 days.

(21) Appl. No.: 16/090,196

(22) PCT Filed: Mar. 28, 2017

(86) PCT No.: PCT/KR2017/003299
§ 371 (c)(1),
(2) Date: Sep. 28, 2018

(87) PCT Pub. No.: WO2017/171342
PCT Pub. Date: Oct. 5, 2017

(65) Prior Publication Data
US 2019/0118294 A1   Apr. 25, 2019

(30) Foreign Application Priority Data
Mar. 29, 2016   (KR) .................. 10-2016-0037840

(51) Int. Cl.
*B23K 26/21*   (2014.01)
*D21H 21/48*   (2006.01)
(Continued)

(52) U.S. Cl.
CPC ............ *B23K 26/21* (2015.10); *B23K 26/352* (2015.10); *C01B 25/168* (2013.01); *C08K 3/32* (2013.01);
(Continued)

(58) Field of Classification Search
CPC .... B23K 26/21; B23K 26/352; C01B 25/168; D06C 29/00; D21H 17/67; D21H 21/48;
(Continued)

(56) References Cited

U.S. PATENT DOCUMENTS 3,004,824 A * 10/1961 Beukenkamp .......... C01B 25/38
423/315
5,489,639 A    2/1996 Faber et al.
(Continued)

FOREIGN PATENT DOCUMENTS

DE         107427 A  *  8/1974
DE         74771 A  * 12/1974
(Continued)

OTHER PUBLICATIONS

C. Ball, Phase Equilibrium Relationships in the Systems CuOP2O5, J. Chem. Soc. (A), 1968, 1113-1115.
(Continued)

*Primary Examiner* — Anthony J Zimmer
(74) *Attorney, Agent, or Firm* — Bayramoglu Law Offices LLC (57) ABSTRACT

A near-infrared-absorption white material, a method of manufacturing the same, and uses thereof. The near-infrared-absorption material includes copper pyrophosphate compound. The copper pyrophosphate compound has a brightness (CIE L*) value of 90 or more in a visible-ray region and is excellent in particle manufacturing properties, and a crystalline structure of the copper pyrophosphate compound is made chemically stable using a heat treatment at a high temperature. The copper pyrophosphate compound is represented by the following chemical formula:

$Cu_2P_2O_7$ or $Cu_2P_2O_7 \cdot xH_2O$ (x=1-3).

10 Claims, 5 Drawing Sheets

(51) Int. Cl.
*C09D 7/61* (2018.01)
*C09D 11/00* (2014.01)
*B23K 26/352* (2014.01)
*C01B 25/168* (2006.01)
*C08K 3/32* (2006.01)
*D06C 29/00* (2006.01)
*D21H 17/67* (2006.01)
*C09D 11/03* (2014.01)
*C09D 11/38* (2014.01)
*C09D 11/037* (2014.01)

(52) U.S. Cl.
CPC ............... *C09D 7/61* (2018.01); *C09D 11/00* (2013.01); *C09D 11/03* (2013.01); *C09D 11/037* (2013.01); *C09D 11/38* (2013.01); *D06C 29/00* (2013.01); *D21H 17/67* (2013.01); *D21H 21/48* (2013.01); *C01P 2002/72* (2013.01); *C01P 2002/88* (2013.01); *C01P 2004/01* (2013.01); *C01P 2006/60* (2013.01); *C08K 2003/328* (2013.01)

(58) Field of Classification Search
CPC ......... C09D 11/00; C09D 11/03; C09D 11/38; C09D 11/037; C09D 7/61; C01P 2002/72; C01P 2002/88; C01P 2004/01; C01P 2006/60; C08K 2003/328; C08K 3/32; C01G 3/02
See application file for complete search history.

(56) References Cited

U.S. PATENT DOCUMENTS

| | | |
|---|---|---|
| 5,800,861 A | 9/1998 | Chiang et al. |
| 2004/0082460 A1 | 4/2004 | Yamane et al. |

FOREIGN PATENT DOCUMENTS

| | | |
|---|---|---|
| EP | 0143933 B1 | 1/1987 |
| EP | 0400305 A2 | 12/1990 |
| EP | 0706897 B1 | 9/1997 |
| EP | 1110660 A2 | 6/2001 |
| EP | 1790701 A1 | 5/2007 |
| JP | 58036911 A * | 3/1983 |
| JP | 2001219387 A | 8/2001 |
| KR | 20020058117 A | 7/2002 |
| KR | 20060085074 A | 7/2006 |
| KR | 20090057746 A | 6/2009 |
| KR | 20110089980 A | 8/2011 |
| KR | 20120043580 A | 5/2012 |
| KR | 20130073358 A | 7/2013 |
| KR | 20150032369 A | 3/2015 |
| KR | 20150074071 A | 7/2015 |
| KR | 20150075739 A | 7/2015 |
| WO | 2006042623 A1 | 4/2006 |

OTHER PUBLICATIONS

B. E. Robertson et al, Crystal structure of β-Cu2P2O7, Canadian Journal of Chemistry, 1968, 46, 605-612.
Kazuaki Hashimoto et al., Synthesis and Property of Copper(II) Hydrogenphosphate, Gypsum & Lime No. 241, 1992.
Hiroaki Onona et al, Mechanochemical Effects on Formation and Properties of Various Copper Phosphates, Phosphorus Research Bulletin, 2005, vol. 18, 37-46.
So-Nhu Le et al. Energetics of copper diphosphates e Cu2P2O7 and Cu3(P2O6OH)2, Solid State Sciences 10, 2008, 761-767.
Hiroaki Onoda et al, Synthesis, Acid and Base Resistance of Various Copper Phosphate Pigments by the Substitution with Lanthanum, Materials Sciences, Mar. 2011.
Rattanai Baitahe et al, Study on thermal transformation of CuHPO4H2O obtained by acetone-mediated synthesis at ambient temperature, J Therm Anal Calorim, 2012.
Martin Breza et al. ChemWiki Chemistry of Copper, On the structure of hexaaquacopper(II) complexes, Journal of Molecular Structure, 1997, vol. 397, 121~128.

* cited by examiner

NEAR-INFRARED ABSORBING WHITE MATERIAL AND PREPARATION METHOD THEREOF

CROSS REFERENCE TO RELATED APPLICATIONS

This application is the national phase entry of International Application No. PCT/KR2017/003299, filed on Mar. 28, 2017, which is based upon and claims priority to Korean Patent Application No. 10-2016-0037840, filed on Mar. 29, 2016, the entire contents of which are incorporated herein by reference.

TECHNICAL FIELD

The present invention relates to a white material having a white color in a visible-ray region and absorbing wavelengths in a near-infrared region, and a method of manufacturing the same. More particularly, the present invention relates to the manufacture of a near-infrared absorption white material which reflects all visible rays to thus have a transparent or white color and which absorbs wavelengths in a near-infrared region, and to various uses and application technologies thereof, such as counterfeit prevention, falsification prevention, and device detection of security products, and laser marking and laser welding of plastics using a near-infrared absorption property of the same, and imparting antibiotic properties to products to which the material is added.

BACKGROUND

A copper pyrophosphate compound, which is a near-infrared-absorption material related to the present invention, is applied to various fields such as optical filters, inks for counterfeit prevention and device detection, plastic marking and welding agents, and imparting of antibiotic properties to various products, and the fields related to the present invention will be briefly described.

The fields of use of the copper pyrophosphate compound manufactured and completed according to the present invention relate to inks and coating agents for counterfeit prevention, falsification prevention, and device detection, and a near-infrared-absorption material is applied to security products such as bank notes, security documents, passports, and checks so as to be used for the purpose of counterfeit prevention or device detection and identification.

In general, there are various materials absorbing wavelengths in a near-infrared region. Examples thereof include carbon black, phthalocyanines, squaryliums, diimoniums, nitrosos, cyanines, nigrosines, triphenylmethanes, dithiolenes, and the copper pyrophosphate compound which is to be manufactured and used in a white-color state in the present invention.

The near-infrared-absorption materials are advantageous and disadvantageous in terms of near-infrared absorbance, light resistance, and heat resistance according to physico-chemical properties thereof, thus being selected and used in conformity with the purpose thereof. However, the near-infrared-absorption materials generally have a specific body color other than a white color (a white or transparent color), which is the color of the material pursued by the present invention.

The material of the present invention absorbs wavelengths in the near-infrared region, among infrared regions. Infrared rays are a kind of electromagnetic wave and have a longer wavelength than visible rays. Generally, the infrared rays are classified into near-infrared rays (0.78 to 3 μm), infrared rays (3 to 25 μm), and far-infrared rays (25 μm or more).

It is an object of the present invention to manufacture a near-infrared-absorption material which has a white color in visible rays (about 380 to 780 nm) and which absorbs near-infrared rays (about 780 to 3,000 nm), and to use and apply the near-infrared-absorption material in conformity with the purpose of absorption of near-infrared rays.

In general, materials which have a white color in visible rays and which absorb a certain level of near-infrared regions are mostly dark or light colored, and papers and patents aiming at white materials are being limitedly investigated.

Since the absorption or reflection of near-infrared wavelengths related to the present invention cannot be seen by the human eye, products to which inks and coating agents including near-infrared absorption materials are applied are only capable of being confirmed using a mechanical method.

Such a mechanical method is implemented using a gallium arsenide (GaAs, a wavelength of 830 nm) semiconductor laser or a neodymium:YAG (Nd:YAG, a wavelength of 1064 nm) laser, which is a near-infrared sensor. These sensors recognize the appropriate combination of the light-emitting part and the light-receiving part of the corresponding laser beam, thereby determining the absorbance or reflectivity of the near-infrared material and the distance to bodies. These infrared sensors are widely used around living environments such as automated teller machines (ATM), home appliances, and car accessories.

Another field of use of the copper pyrophosphate compound manufactured and completed according to the present invention relates to plastic marking and welding. Plastics are generally used in living environments, and the need for visual displays, device readout displays, counterfeit-prevention displays, and a technique for instantly welding plastics has been required for related products. The need can be met by adding the near-infrared-absorption material to plastics.

In recent years, the development of laser technology and apparatuses has made it possible to realize such a display method, but marking and welding of plastics cannot be implemented using only laser technology. In this regard, a near-infrared absorbent is required as an additive that enables marking and welding during the formation of plastics.

The marking and welding of plastics is mainly performed using a neodymium:YAG laser. Since the wavelength of this laser is 1064 nm, which is a near-infrared region, a near-infrared absorbent absorbing the corresponding wavelength is required.

Another field of use of the copper pyrophosphate compound manufactured according to the present invention may be the field of antibiotics. Copper-based compounds have already been recognized for the antibiotic properties thereof, and thus are currently applied to products such as plastic, paper, ink, paint, wallpaper, and linoleum in living environments.

To summarize, the copper pyrophosphate compound related to the present invention is widely used and applied to a variety of applications such as counterfeit prevention, falsification prevention, device detection, laser marking, laser welding, and antibacterial products.

There are many materials that absorb wavelengths in the near-infrared region in connection with the present invention, and copper pyrophosphate compounds to be manufactured in a white-color state in the present invention are also applicable thereto.

In order to manufacture a material which has a brightness (CIE L*) value of 90 or more and which is excellent in particle properties as an object of the present invention, a copper pyrophosphate compound ($Cu_2P_2O_7$, $Cu_2P_2O_7.xH_2O$) was selected as a near-infrared-absorption material. In order to investigate synthesis methods and the technical characteristics of synthesis materials thereof, the following papers and patents have been reviewed.

In general, the copper pyrophosphate compound has a hydrate type and an anhydride type, and has alpha-type and beta-type structures as a monoclinic crystalline structure thereof. The copper pyrophosphate compound is not soluble in water, has a light blue-green or dark blue-green color in appearance, and is mainly used as electroplating materials, molecular sieves, and catalysts.

Early documents introduce the wet and dry synthesis methods of copper pyrophosphate compounds as follows (C. Ball, "Phase-Equilibrium Relationships in the Systems $CuOP_2O_5$", J. Chem. Soc. (A), 111318 (1968)).

$2CuO+2BPO_4 \rightarrow 900° C. \rightarrow Cu_2P_2O_7+B_2O_3$ $2CuO+2(NH_4)_2HPO_4 \rightarrow 850° C. \rightarrow Cu_2P_2O_7+4NH_3+3H_2O$ $CuO+Cu(PO_3)_2 \rightarrow 750° C. \rightarrow Cu_2P_2O_7$ $Cu_3(PO_4)_2+Cu(PO_3)_2 \rightarrow 900° C. \rightarrow 2Cu_2P_2O_7$ $CuCO_3.Cu(OH)_2.H_2O+2H_3PO_4 \rightarrow Cu_2P_2O_7+CO_2+5H_2O$ In addition, it has been reported that the copper pyrophosphate compound was synthesized in an aqueous solution using tetrasodium pyrophosphate ($Na_4P_2O_7$) and copper sulfate as raw materials and that the synthesized product was a green crystalline material having an alpha-type monoclinic crystalline structure at low temperatures and a beta-type monoclinic crystalline structure at a high temperature (Crystal structure of p-$Cu_2P_2O_7$", Canadian Journal of Chemistry, 46, 605 (1968)).

In addition, it has been reported that copper hydrogen phosphate ($CuHPO_4.H_2O$) is synthesized, heated, and dehydrated to manufacture an alpha-type copper pyrophosphate compound having a green crystal, and antibiotic properties thereof are disclosed (Gypsum & Lime No. 241, 435 p (1992)).

In addition, it has been reported that the copper pyrophosphate compound was synthesized in a solid form using ammonium dihydrogen phosphate and basic copper carbonate, and the endothermic and exothermic reactions and the crystallinity of the synthesis process have been disclosed. Further, it has been reported that the color of the compound depended on a synthesis starting material, solid or wet synthesis, a pH, a synthesis time, a temperature, a calcination time, and particle sizes and shapes according to factors such as pulverization ("MECHANOCHEMICAL EFFECTS ON FORMATION AND PROPERTIES OF VARIOUS COPPER PHOSPHATES", Phosphorus Research Bulletin Vol. 18(2005), 37-46).

In addition, it has been reported that the copper pyrophosphate compound was changed to an alpha type and a beta type in the range of 65 to 90° C. and that the enthalpy of a crystalline phase change was as small as 0.15±0.03 kJmol$^{-1}$ as a result of DSC measurement, which shows that a phase change was very reversible (Solid State Sciences, 10, 761-767(2008)).

In addition, it has been reported that the copper pyrophosphate compound was synthesized using a dry method and a wet method with variable molar ratios of basic copper carbonate and a phosphoric acid and then subjected to heat treatment. It has also been reported that a particle distribution was 100 μm or less and the color was light blue or light green and became slightly white when the compound contained some lanthanide metals ("Synthesis, Acid and Base Resistance of Various Copper Phosphate Pigments by the Substitution with Lanthanum", Materials Sciences and Applications, 2011, 209-214).

In addition, it has been reported that copper carbonate and a phosphoric acid were reacted in an aqueous solution state to thus manufacture copper hydrogen phosphate ($CuHPO_4.H_2O$) and the copper hydrogen phosphate was calcined at 300° C., followed by three steps of dehydration and dehydrogenation, thus manufacturing a copper pyrophosphate compound in a crystallized form. It has also been reported that the color thereof was light blue (Study on thermal transformation of $CuHPO_4.H_2O$ obtained by acetone-mediated synthesis at ambient temperature, J Therm Anal Calorim (2012) 110:625632).

According to the result of analyzing the technical data on the synthesis of copper pyrophosphate compounds as described above, a method of manufacturing a copper pyrophosphate compound having a brightness (CIE L*) value of 90 or more and a fine particle shape, which is the target of the present invention, has not been found. Further, the papers disclose that copper pyrophosphate compounds which are commercially manufactured and sold have a blue color when they are hydrates or anhydrides and that the brightness value thereof is 90 or less.

The following patents were reviewed in order to investigate the technical characteristics in connection with the manufacture and use of the copper pyrophosphate compound of the present invention.

According to a European patent (EP 0143933B1, 1984), basic copper phosphate ($Cu_3(PO_4)_2.Cu(OH)_2$, manufactured using a general method, has a dark blue color, thus being restricted in use. Therefore, the European patent describes a method of manufacturing a light blue material by improving the synthesis method.

A European patent (EP 0400305A2, 1990) describes a polymer for laser marking to which copper hydroxyphosphate is added, and a US patent (U.S. Pat. No. 5,489,639A, 1994) describes a composition for laser marking, in which copper salts such as copper phosphates or copper sulfates are added to thermoplastic resins. However, both of them are colored.

A European patent (EP 0706897B1, 1995) describes a method of adding a copper phosphate compound to a thermoplastic polyurethane, thus performing marking using a neodymium:YAG laser. For the copper phosphate-based compound, blue $Cu_3(PO_4)$ and a green crystal of $Cu_3(PO_4)_2.Cu(OH)_2$ are mainly used, and $Cu_3(PO_4)_2.3Cu(OH)_2$, $Cu_3(PO_4)_2.2Cu(OH)_2.H_2O$, $4CuO.P_2O_5$, $4CuO.P_2O_5.3H_2O$, $4CuO.P_2O_5.1.5H_2O$, and $4CuO.P_2O_5.1.2H_2O$ are used as the rest. However, all of them have a blue or green color.

US patents (U.S. Pat. No. 5,800,861A, 1998 and U.S. Pat. No. 5,489,639, 1996) describe an infrared-absorbing resin in which copper phosphate, basic copper phosphate, and copper pyrophosphate compounds are mixed with a resin.

A European patent (EP 1,110,660, 2000) describes a method of forming a copper pyrophosphate compound (Alfa AESAR Corporation) in a coating material form, applying the copper pyrophosphate compound, and performing marking using a carbon dioxide laser.

A Korean patent (2002-0058117) describes a method of manufacturing a near-infrared absorbent of a copper compound granulated by mixing copper tetrafluoroborate, an orthophosphoric acid, and aluminum oxide with agitation, followed by heat treatment at a high temperature. However, the composition thereof is not disclosed.

A European patent (EP 1790701, 2005) describes the manufacture of intaglio ink absorbing near-infrared rays by pulverizing glass for infrared filters manufactured according to a US patent (US 20040082460) to 8 to 10 μm, and also a method of manufacturing intaglio ink by dehydrating and heat-treating copper phosphate hydrates ($Cu_3(PO_4)_2.2H_2O$) at 400° C. for 2 hours to thus form copper phosphate anhydrides. The patent claims thereof disclose that copper hydroxide ($Cu(OH)_2$), copper phosphate ($Cu_3(PO_4)_2.2H_2O$), and anhydrous copper phosphate ($Cu_3(PO_4)_2$) are included as a copper phosphate compound, and that $PO_4(OH)$:Libethenite, ($Cu_3(PO_4)(OH)_3$:Cornetite, $Cu_5(PO_4)_3(OH)_4$: Pseudomalachite, $CuAl_6(PO_4)_4(OH)_8.5H_2O$:Turquoise, copper pyrophosphate trihydrate ($Cu_2(P_2O_7).3H_2O$), copper pyrophosphate anhydride ($Cu_2P_2O_7$), and copper metaphosphate ($Cu(PO_3)_2$ are included as copper phosphate minerals. However, this patent includes a copper pyrophosphate compound to be manufactured and used in the present invention, but copper pyrophosphate compounds that are commercially manufactured and sold have a blue color. Accordingly, this patent is different from a copper pyrophosphate compound of which the brightness is 90 or more, which is the target of the present invention.

In connection with the present invention, a worldwide patent (WO 2006042623A1, 2004) describes a claim that a copper phosphate compound is used for plastic welding. As the copper phosphate compound, $Cu_3(PO_4)_2.2Cu(OH)_2$: (CHP=Libethenite) is mainly used, and $CuO_4.P_2O_5$, $5CuO.P_2O_5.3H_2O$, $4CuO.P_2O_5.H_2O$, $Cu_3(PO_4)_2.Cu(OH)_2$, $Cu_2P_2O_7.H_2O$, $6CuO.P_2O_5.3H_2O$, $4CuO.P_2O_5.3H_2O$, $4CuO.P_2O_5.1.2H_2O$, and $4CuO.P_2O_5.1.5H_2O$ are included.

The copper phosphate compounds used in this patent, which are commercially manufactured and sold, are almost blue or green in color and have a hydrate structure, thereby being different from that of the present invention.

A Korean patent (Korean Laid-Open Patent Application No. 10-2006-0085074) describes a method of mixing copper hydroxides, copper oxides, phosphoric acids, boric acids, and fluoroboric acids using a solid synthesis method to thus perform solidification and performing calcination at a high temperature of 700 to 1000° C. to thus realize granulation. This patent aims at synthesizing a copper phosphate compound which has a white color and a particle property and which is in conformity with the object of the present invention. However, the structural formula of the material is not disclosed, and there is a drawback in that byproducts of the boric acids and fluoroboric acids other than copper phosphates among the materials added during synthesis must be treated.

As a result of review of the technologies of the documents and the prior patents, a material which has a brightness of 90 or more, which is excellent in particle properties, and which has a crystalline structure that is made stable using heat treatment at a high temperature is used in a chemically stable form as the near-infrared-absorption material, which is the target of the present invention, thereby being significantly different from the conventional technologies.

SUMMARY

Technical Problem

Although there is a difference in the extent of restriction thereof, conventional near-infrared-absorption materials related to the present invention are restricted in use and application fields because they are essentially colored in a visible-ray region.

It is an object of the present invention to develop a material which has a white color in a visible-ray region and which performs absorption in a near-infrared region. To this end, copper pyrophosphate compounds are selected as a target material, and are characterized in that a brightness (CIE L*) is 90 or more and in that it is easy to perform granulation even though heat treatment is performed at a high temperature.

Referring again to the documents or patents relating to copper pyrophosphate compounds in direct connection with the present invention, the papers disclose that the colors of the synthesis materials and commercial products are light green or dark green and light blue or dark blue. Based on the claims of the patents (WO 2006042623A1: 2004, EP1790701: 2005) simply including copper pyrophosphate compounds, it is considered that the copper pyrophosphate compounds are colored if they are not directly manufactured so as to have a brightness of 90 or more.

In the present invention, the brightness is maintained at 90 or more and a crystalline structure that is chemically stable is ensured using heat treatment at a high temperature. This is intended to avoid the drawbacks caused by the use of colored materials and to broaden the field of use.

The document ("MECHANOCHEMICAL EFFECTS ON FORMATION AND PROPERTIES OF VARIOUS COPPER PHOSPHATES", Phosphorus Research Bulletin Vol. 18 (2005), 37-46) reviewed in order to manufacture a copper pyrophosphate compound which has a brightness of 90 or more, whose structure is converted into a crystalline structure at a high temperature, and which is excellent in fine particle properties as the target near-infrared-absorption material of the present invention discloses that the color may be adjusted by appropriately setting raw materials for synthesis, synthesis methods, and synthesis conditions.

The hydrates or anhydrides of copper pyrophosphates manufactured using a simple synthesis method in various documents have a light blue color, and all materials that are manufactured and sold commercially for the purpose of electric copper plating have a blue color. It can be deemed that the reason why the synthesized or sold materials have a blue color is because copper ions are not completely bonded to a phosphoric acid.

However, a copper pyrophosphate compound that is subjected to mixing, heat treatment at a high temperature, and granulation using a general solid synthesis method tends to have a white color. Therefore, it has been predicted that whitening can be achieved by improving the synthesis method.

In order to upgrade the color and the particle properties based on many references in the present invention, a wet method is selected as the synthesis method, a copper compound and a pyrophosphoric acid compound are selected as raw materials, a synthesis temperature, a synthesis concentration, and a pH are adjusted, acid treatment is performed in order to ensure particle stability, and a crystallization process is performed using heat treatment at a high temperature, thereby manufacturing a white material that is excellent in particle properties.

Technical Solution

The present invention provides a near-infrared-absorption white material including a copper pyrophosphate compound which has a brightness of 90 or more in a visible-ray region and also has a crystalline structure that is made chemically stable using heat treatment at a high temperature and which is excellent in fine particle properties and is represented by the following chemical formula, a method of manufacturing the same, and uses and application products thereof in counterfeit prevention, falsification prevention, device detection, laser marking, and laser welding using an absorption property, and in antimicrobials using an antibacterial property of a copper compound.

$Cu_2P_2O_7$ or $Cu_2P_2O_7 \cdot xH_2O$ ($x$=1~3).  (Chemical Formula)

Advantageous Effects

As described above, the near-infrared-absorption material of the copper pyrophosphate compound according to the present invention is manufactured so as to have a color that is closer to a white color compared to conventional absorption materials. Accordingly, there is a merit in that the absorption material does not affect colors when manufacturing ink, coating agents, paint, laser marking and welding agents, additives, and antimicrobials using an absorption property in a near-infrared region. There is another merit in that fine particles are manufactured using a wet synthesis method, thus obviating a granulation process according to a solid synthesis method.

DETAILED DESCRIPTION

Hereinafter, the present invention will be described below in detail with reference to the accompanying drawings and embodiments.

The basic formulas of the synthesis material and the reaction material of the present invention are, for example, as follows.

$2CuCl_2 + Na_4P_2O_7 \rightarrow Cu_2P_2O_7 + 4NaCl$

The properties of a copper compound and metal pyrophosphate used as the synthesis materials will first be described.

First, reviewing the behavior of the copper compound, which is a raw material for synthesis in an aqueous solution state in the present invention, copper ions are present in a typical hexaaquacopper divalent ion $(Cu(H_2O)_6)^{2+}$ form in a dilute aqueous solution.

When a concentrated hydrochloric acid is added to the hexaaquacopper divalent ion solution, six water molecules are substituted with chlorine ions. In connection therewith, the reaction is reversible. A blue color is exhibited when the hexaaquacopper divalent ions $(Cu(H_2O)_6)^{2+}$ are formed, and an olive green or yellow color is exhibited when substitution with the chlorine ions are performed.

The hydroxide ions are stable in an acidic state and are bonded as sodium hydroxide to copper ions to thus be precipitated and separated (ChemWiki: Chemistry of Copper, "On the structure of hexaaquacopper(II) complexes", Journal of Molecular Structure, Vol. 397, Issues 13, 1997, Pages 121128).

In the present invention, in order to make the color of the reaction material white, the acidic state needs to be maintained so that the hexaaquacopper divalent ions are not formed in an aqueous solution state.

Reviewing the properties and the reaction of copper chloride as an example of the copper compound, which is the synthesis material, the form of the aqueous solution of the copper compound obtained using copper chloride depends on concentrations, temperature, and added chlorine ions, and this compound corresponds to blue hexaaquacopper divalent ions and yellow or brown copper chloride ions $(CuCl_2^{+x})^x$ as a halogen compound (Wikipedia: Copper(II) chloride).

In addition, for example, the water solubility of copper chloride varies depending on the temperature, and the copper chloride is dissolved in an amount of 69.2 g at 0° C., 76.4 g at 25° C., 89.4 g at 60° C., and 110.5 g at 100° C. based on 100 ml of water. Further, the copper sulfate is dissolved in an amount of 14.2 g at 0° C., 22.0 g at 25° C., 40.5 g at 60° C., and 77.0 g at 100° C. Based on these data, it can be predicted that the hexaaquacopper divalent ions are not formed if the reaction is performed while maintaining the concentration in a saturated solution form at a synthesis temperature.

In the present invention, it is predicted that the synthesis material is made white when the reaction is performed while the reaction aqueous solution is maintained at a high concentration or maintained in a saturated solution form at a reaction temperature in order to prevent the generation of the hexaaquacopper divalent ions as reviewed above.

Although copper compounds usable in the present invention are not significantly limited, divalent copper sulfate, copper chloride, copper nitrate, copper phosphate, and copper acetate hydrates and anhydrides thereof may be used. However, it is preferable to use copper chloride hydrates or anhydrides in consideration of the complex salt form or the generation and treatment of byproducts after the reaction.

Further, in the present invention, examples of the metal pyrophosphate used as a raw material for synthesis may include tetrasodium pyrophosphate ($Na_4P_2O_7$), tetrapotassium pyrophosphate ($K_4P_2O_7$), and hydrates thereof.

The properties of the metal pyrophosphates described in the general data are as follows.

Tetrasodium pyrophosphate, tetrasodium pyrophosphate.decahydrate, tetrapotassium pyrophosphate, and tetrapotassium pyrophosphate.trihydrate are white crystalline powder, and are frequently used in emulsifiers, buffering agents, dispersants, sequestrants, various types of food additives, toothpaste, and household detergents.

In addition, the pH of the tetrasodium pyrophosphate is 9.9 to 10.7 in the case of a 1% aqueous solution, the tetrasodium pyrophosphate is stable at 70° C. or lower, and the solubility thereof varies depending on the temperature. The tetrasodium pyrophosphate is dissolved in an amount of 2.23 g at 0° C., 6.62 g at 25° C., 10.10 g at 40° C., 20.07 g at 60° C., and 30.67 g at 100° C. based on 100 ml of water.

Further, the pH of the tetrapotassium pyrophosphate is 10.2 in the case of the 1% aqueous solution, and the solubility thereof is 187 g at 25° C. based on 100 ml of water. The tetrapotassium pyrophosphate has very strong hygroscopicity until it becomes trihydrate, two water molecules thereof are lost at 180° C., and it is converted into anhydrides at 300° C.

For the white particles, which are the target of the present invention, the reaction temperature of the aqueous solution of the metal pyrophosphate is designed to be 60° C. so that saturation is realized. This is to prevent the generation of the hexaaquacopper divalent ions as reviewed above.

As the metal pyrophosphate used to synthesize the copper pyrophosphate compound of the present invention, tetrasodium pyrophosphate and hydrates thereof and tetrapotassium pyrophosphate and hydrates thereof may be used.

In conclusion, in order to increase the brightness of the copper pyrophosphate compound, the concentration of the reaction aqueous solution of copper chlorides and metal pyrophosphates used as synthesis materials is maintained at a saturation level and the reaction temperature is raised to thus perform synthesis in a supersaturated aqueous solution. This is to perform synthesis in a manner similar to a solid synthesis method by excluding as much water as possible even though the synthesis is performed using a wet synthesis method.

The use and application related to the near-infrared-absorption material manufactured according to the present invention will be briefly described, but the present invention is not limited thereto.

In the field of use of the near-infrared-absorption material, intaglio inks may be manufactured by replacing an inorganic pigment with the material of the present invention, as in Korean patents (Korean Laid-Open Patent Application Nos. 1020150032369, 1020150075739, 1020130073358, and 1020090057746), and general planographic inks, gravure inks, and flexo inks may be manufactured by adding the material of the present invention to a known ink composition. A near-infrared-absorption effect is ensured and the material may be effectively measured using an infrared sensor only when the near-infrared-absorption material is contained in an amount of about 10 to 60 wt % in an ink composition. It is preferable that the near-infrared-absorption material be contained in an amount of 20 to 50 wt %.

Further, in the field of the use of near-infrared-absorption material, the material of the present invention may be used for plastic marking and welding and absorbs 800 to 2000 nm, which is a near-infrared-absorption region. This is based on the fact that the maximum absorption wavelength thereof is near 890 m and that the laser wavelength used for marking and welding is 1064 nm.

In addition, laser welding will be described in more detail. In order to weld the upper and lower layers of plastics using a laser, the upper layer must have a composition through which the laser passes and the lower layer must contain a material that absorbs the laser wavelength. Accordingly, the laser passes through the upper layer and instantly melts the lower layer, and then a portion of the upper layer is melted to thus weld the two layers by fusion.

For the purpose of effective laser marking and welding, the near-infrared-absorption material is generally added in an amount of 0.1 to 5%, although there is a difference according to the kind of plastic. In some cases, an auxiliary additive may be required for more clear marking and welding.

Since the near-infrared-absorption material of the present invention has a brightness of 90 or more, there is a merit in that it does not affect the appearance color of the plastic to be marked and welded.

The marking and welding of these plastics may be applied to a variety of thermoplastic plastics such as polycarbonate, polyethylene, polyethylene terephthalate, polyimide, polyphenylene oxide, polypropylene, polystyrene, polysulfone, vinylidene chloride, vinyl chloride, and nylon. It is possible to use a mixture of additives in order to perform effective marking and welding, without being limited thereto.

Further, the copper pyrophosphate compound, which is the near-infrared-absorption material of the present invention, has an antibiotic effect, so that the copper pyrophosphate compound may be variously applied to and used in products requiring a white color, products produced at a high temperature, and products requiring stable physical and chemical properties.

Such a product may be applied to various applications such as inks, plastics, paints, coating materials, paper, wallpaper, linoleum, home appliances, and household goods, and the application technology thereof is not largely limited.

In the present invention, in order to develop a near-infrared-region-absorption material which has a brightness (CIE L*) of 90 or more in a visible-ray region and also has a crystalline structure that is made chemically stable using heat treatment at a high temperature and which is excellent in fine particle properties, the following procedure is performed.

The near-infrared-absorption material of the present invention is a copper pyrophosphate compound system, and the raw materials for synthesis include a copper compound and a metal pyrophosphate compound. The process for manufacturing the material is performed through mixing, agitation, filtration, acid treatment, filtration, washing, drying, and heat treatment steps.

As the copper compound used in the synthesis, hydrates of copper chloride, copper sulfate, copper nitrate, copper phosphate, and copper acetate and anhydrides thereof may be used. Copper chloride, generating salts as a byproduct after the reaction, is preferable, without limitation thereto. As the metal pyrophosphate, tetrasodium pyrophosphate and hydrates thereof and tetrapotassium pyrophosphate and hydrates thereof may be used.

The most important factor in the manufacture of the white material of the present invention is the concentration of the aqueous solution when the synthesis materials are mixed and agitated. As technically reviewed above, when the aqueous solution of the reaction process is very dilute, hexaaquacopper ions are formed. It is considered that the ions participate in the generation of the copper pyrophosphate compound to thus exhibit a blue color.

In the present invention, a copper compound solution and a metal pyrophosphate compound solution are maintained in a supersaturated solution form to perform synthesis so that hexaaquacopper ions are not generated. As an example of the reaction, when copper chloride is made into an aqueous solution, the temperature is increased to 60° C. and about 90 g of copper chloride is dissolved in 100 ml of water to thus keep a salt concentration at a supersaturated solution level. Accordingly, since the copper compound is dissolved in water at a high concentration, it is expected that the hexaaquacopper ions are not formed, thus forming a white material.

Further, the sodium pyrophosphate reacting with the copper compound is reacted at about 60° C. instead of room temperature so that the supersaturated solution is maintained to thus prevent the hexaaquacopper ions from being formed.

The above-described two solutions are maintained at a temperature that is higher than room temperature in order to react in a supersaturated state. It is preferable to perform the reaction at about 40 to 90° C., and it is most preferable to perform the reaction at 50 to 70° C., considering the various reaction conditions.

When the two solutions in a supersaturated state are mixed with mechanical agitation while maintaining a pre-determined temperature, a white precipitate is formed.

In the reaction solution of the present invention, the white precipitate of the copper pyrophosphate compound and sodium salts or potassium salts, which are the byproducts of the reaction, are dissolved in water. This reaction solution is filtered to separate the precipitate, and washing is performed using water to remove the sodium salts or the potassium salts, followed by re-dispersion in water. The precipitate of the copper pyrophosphate compound formed using the reaction solution needs to be subjected to an acid treatment process in order to provide stability of the particles and a crystalline structure at a high temperature.

In order to perform the acid treatment, an acidic salt is slowly added to the precipitate re-dispersed in water, the pH is maintained acidic, and aging is performed, followed by filtration and washing. The acidic salt for the acid treatment is not largely limited, but a hydrochloric acid, a phosphoric acid, and a sulfuric acid are preferred.

The precipitate that is generated may be dried and then used, or may be used in the form of a crystalline structure that is made stable using heat treatment at a high temperature according to the intended use. In the case where the acid treatment is not performed, the hydrate of copper pyrophosphate is dehydrated in the range of about 100° C., and the presence of water in a natural form is expected. In the case where the acid treatment is performed, dehydration occurs in the range of 250 to 300° C., and the presence of water in a bound form is expected.

The apparatus for analyzing the physicochemical properties of the copper pyrophosphate compound salt manufactured according to the present invention is as follows.

The color-difference meter was a model Datacolor-600, manufactured by Datacolor Corporation in the USA.

The infrared ray analysis was performed by a model FTIR-4600 manufactured by JASCO Corporation in Japan, and the measurement range was 650 to 4000 $cm^{-1}$.

The thermal analyzer was a model Q50, manufactured by TA instrument Corporation in the USA, the temperature range was from room temperature to 800° C., the heating rate was 10° C./min, and the atmosphere was nitrogen.

The near-infrared measuring apparatus was a model V-670, manufactured by JASCO Corporation in Japan, the measurement range was 400 to 2500 nm, and an integrating-sphere measurement method was used.

The electron microscope SEM apparatus was a model JSM-6700F manufactured by JEOL Corporation in Japan, and the measurement range was 2 to 50 µm. The crystalline structure XRD analyzer was a model Miniflex-600 manufactured by Rigaku Corporation in Japan, and the range of scanning was 5 to 70 degrees.

The present invention will be more specifically described with reference to the following Examples, but is not limited to the Examples.

Example 1 Manufacture of Copper Pyrophosphate Compound

In order to synthesize a copper pyrophosphate compound having a high brightness, the reaction was performed in a supersaturated aqueous solution state. To a 1-liter beaker, 530 ml of water was added, and 55 g of sodium pyrophosphate anhydride was added thereto while the temperature was maintained at 60° C., and was dissolved with agitation using a mechanical agitator. 50 ml of water was added to another beaker, and 68 g of copper chloride dihydrate was added thereto while the temperature was maintained at 60° C., and was dissolved with agitation.

While the aqueous solution containing the sodium pyrophosphate anhydride dissolved therein was agitated, the aqueous solution of copper chloride was slowly added thereto, followed by an aging reaction for a predetermined period of time. The white precipitate generated after completion of the reaction was filtered, washed, and re-dispersed in 1 kg of water, and the temperature was maintained at 60° C.

In order to perform acid treatment, the re-dispersed precipitate aqueous solution was heated to 60° C., a diluted hydrochloric acid solution was added slowly thereto so that the pH was maintained at 3.0, and agitation was continued for 1 hour.

After completion of the reaction, filtration, washing, and drying were performed, and heat treatment was performed at 750° C., thus realizing crystallization.

Example 2 Manufacture of Copper Pyrophosphate Compound

To a 1-liter beaker, 400 ml of water was added, and 68 g of potassium pyrophosphate anhydride was added thereto while the temperature was maintained at 60° C., and was dissolved with agitation using a mechanical agitator. 250 ml of water was added to another beaker, and 103 g of copper sulfate pentahydrate was added thereto while the temperature was maintained at 60° C., and was dissolved with agitation.

The subsequent process was the same as that of Example 1, the acid treatment was performed using a phosphoric acid, and the pH was maintained at 3.5. After completion of the reaction, filtration, washing, and drying were performed, and the heat treatment was performed at 750° C., thus realizing crystallization.

Comparative Example 3 Manufacture of Copper Pyrophosphate Compound

The brightnesses of Example 1 and Example 2, in which a copper pyrophosphate compound was synthesized using a general method to thus react in a supersaturated aqueous solution state, were compared. To a 2-liter beaker, 1000 ml of water was added, and 55 g of sodium pyrophosphate was added thereto at room temperature and dissolved with agitation using a mechanical agitator. 500 ml of water was added to another beaker, and 68 g of copper chloride dihydrate was added thereto at room temperature and dissolved with agitation.

After completion of the reaction, filtration, washing, and drying were performed, and the properties before and after heat treatment are set forth in Table 1.

Comparative Example 4 Properties of Commercially Manufactured Copper Pyrophosphate Compound A copper pyrophosphate compound or hydrates of the copper pyrophosphate compound are commercially manufactured and sold for use in electroplating. In order to compare the brightness thereof to those of the materials synthesized in the Examples and to test them, copper pyrophosphate.hydrates ($Cu_2P_2O_7 \cdot xH_2O$, $x=1\sim3$) were purchased and then used.

The analysis results of the physicochemical properties of Examples 1 and 2 and Comparative Examples 3 and 4, manufactured according to the present invention, are as follows.

The brightness of fine particles obtained by crystallizing the copper pyrophosphates of Example 1, Example 2, Comparative Example 3, and Comparative Example 4 using heat treatment at 750° C. was measured. As a result, the brightness (CIE L*) was 95 or more in Examples 1 and 2 manufactured using the technology of the present invention. However, the brightness of Comparative Example 3, which was manufactured using a conventional method, and Comparative Example 4, which was commercially manufactured, was about 80, and a high green value (CIE a*) and blue value (CIE b*) were exhibited. Accordingly, it was possible to manufacture a material having a brightness of 90 or more, which cannot be realized by materials that were manufactured using the conventional technology or by commercially manufactured materials (Table 1).

Table 1 shows the brightness and color difference table values of the copper pyrophosphate compounds of the Examples and the Comparative Examples

|  | Example 1 (manufactured) | Example 2 (manufactured) | Comparative Example 3 (manufactured) | Comparative Example 4 (Aldrich Corporation) |
| --- | --- | --- | --- | --- |
| CIE L* | 96.49 | 95.81 | 80.18 | 80.90 |
| CIE a* | −3.01 | −0.16 | −26.66 | −11.13 |
| CIE b* | 2.77 | 1.29 | −19.15 | −16.25 |

Figure 1:
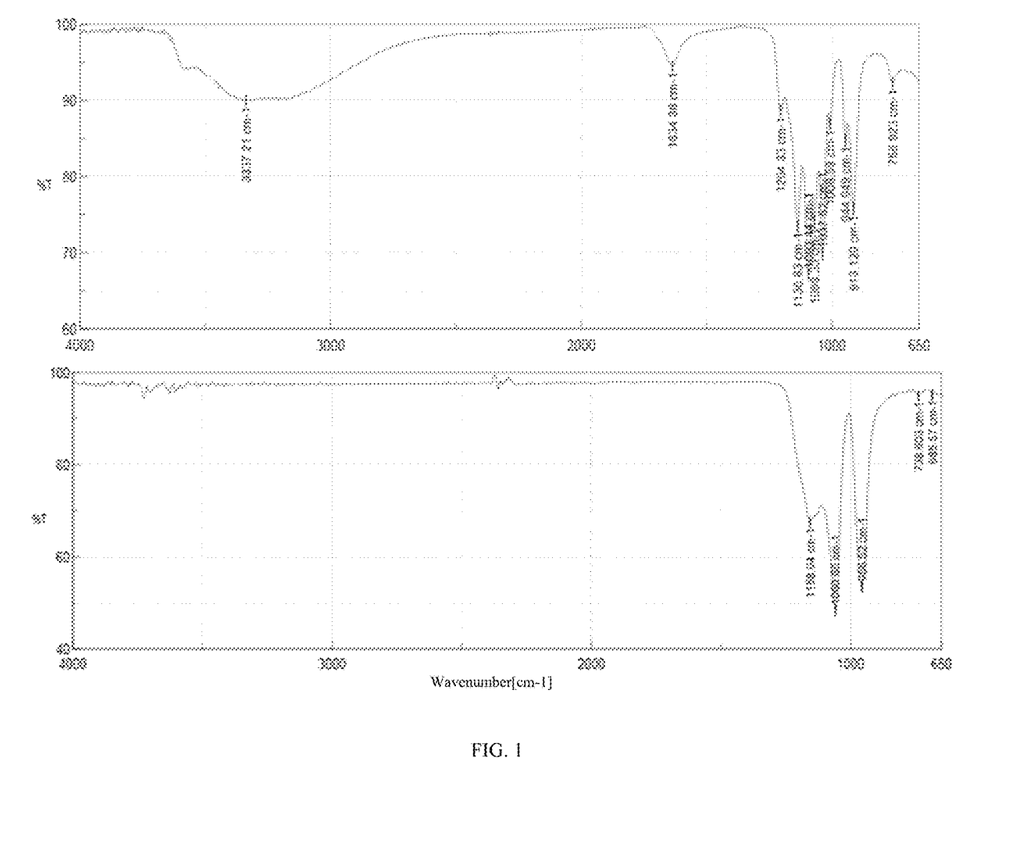
FIG. 1 shows an FTIR spectrum of the hydrate structure (upper side) of a copper pyrophosphate compound and the anhydrous crystalline structure (lower side) thereof, which is crystallized at 750° C.

The result of the infrared spectroscopic analysis of the hydrate of the copper pyrophosphate compound synthesized in Example 1 and the anhydride thereof crystallized at 750° C. was in agreement with the infrared spectrum of the hydrate structure and the crystalline structure of the documents (FIG. 1).

Figure 2:
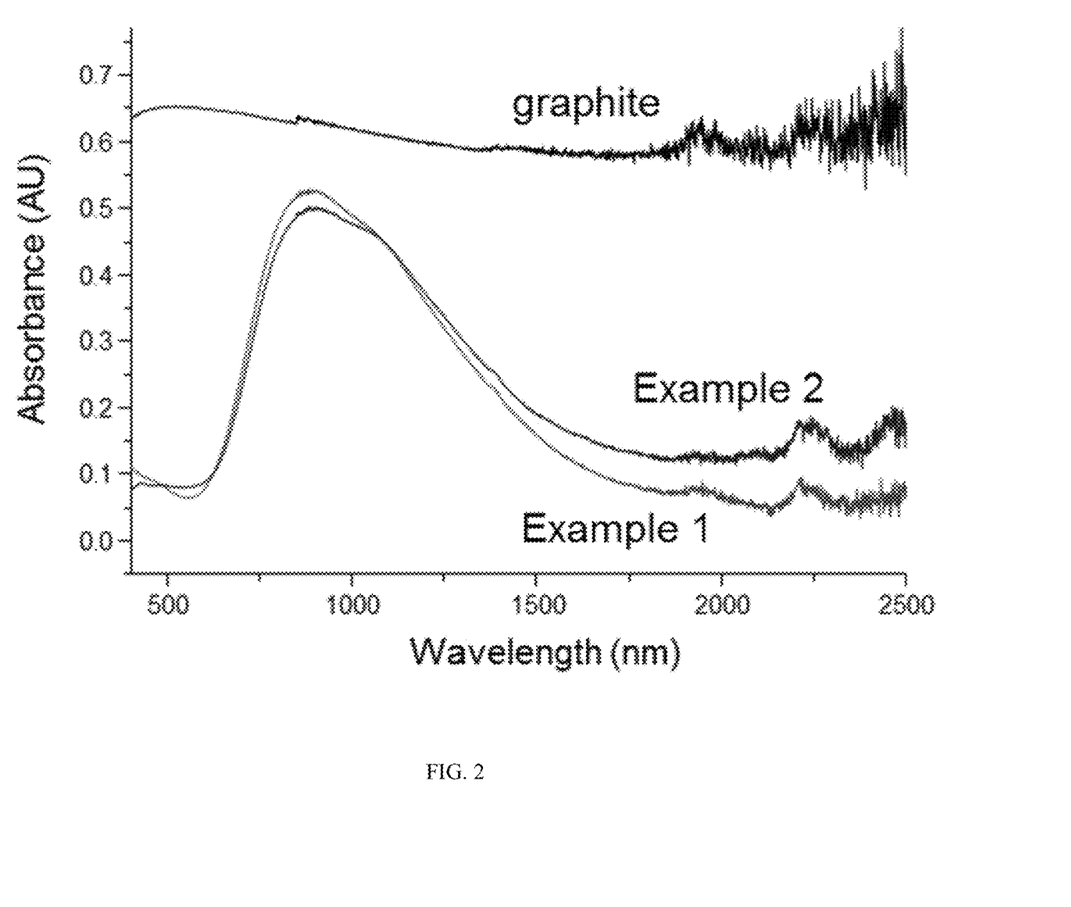
FIG. 2 shows a near-infrared-absorption spectrum of the copper pyrophosphate compound.

The near-infrared absorbance of the copper pyrophosphate anhydrides synthesized in Examples 1 and 2 was measured. For the purpose of comparison with graphite, strongly absorbing near-infrared rays, measurement was performed from 400 nm, which is a visible-ray region to 2500 nm, which is a near-infrared region. The graphite was black in the visible rays and absorbed the near-infrared rays, but the copper pyrophosphate compound was white in the visible rays and strongly absorbed the near-infrared rays in the region of 800 nm to 2000 nm. Accordingly, the above-described characteristic could be used, and the maximum absorption wavelength of the near-infrared rays was around 890 nm (FIG. 2).

Figure 3:
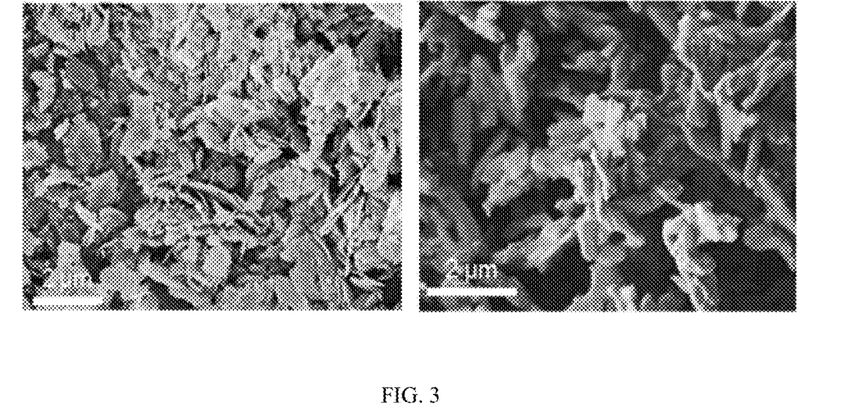
FIG. 3 shows an electron micrograph of the hydrate structure (left side) and the anhydrous crystalline structure (right side) of the copper pyrophosphate compound.

The fine particles of the copper pyrophosphate anhydride synthesized in Examples 1 and 2 were checked using an electron microscope. As a result, when the copper pyrophosphate was present in a hydrate or noncrystalline form, the basic particles had a size of about 2 μm and a monoclinic tabular form. When crystallization was performed at a high temperature of 750° C. or higher, the basic particles had a reduced size of about 1 μm and a rod form. The copper pyrophosphate compound of the present invention may be modified into the form of a hydrate or an anhydride or a crystallized form according to the application field and characteristics thereof, and then used (FIG. 3).

Figure 4:
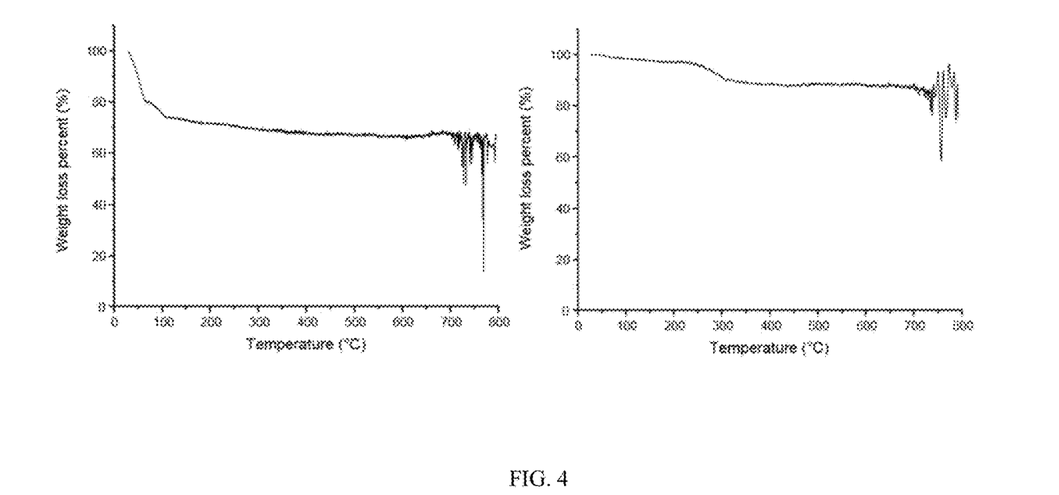
FIG. 4 shows a TGA thermal degradation curve of a product that is not subjected to acid treatment (left side) and a product that is subjected to acid treatment (right side) in the manufacture of the copper pyrophosphate compound.

The results of the thermal analysis of the hydrate of copper pyrophosphate synthesized in Example 1 showed that the hydrate was removed due to drying at about 100° C. when acid treatment was not performed during a synthesis process, but that the hydrate was present as water of crystallization and converted into the anhydride near 250 to 300° C. when the acid treatment was performed. With respect to this, it is interpreted that the acid treatment prevents the particles from aggregating during a heat treatment process at a high temperature in connection with the size of the fine particles (FIG. 4).

Figure 5:
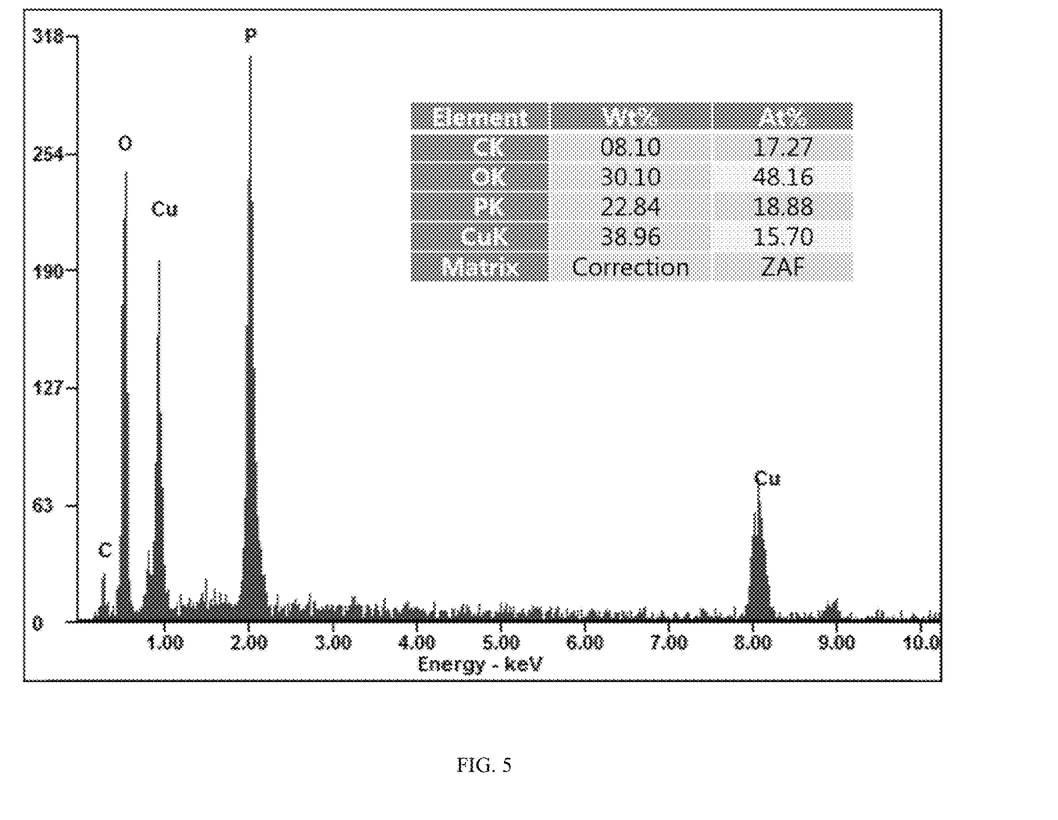
FIG. 5 shows an elementary analysis spectrum of the anhydrous crystalline structure of the copper pyrophosphate compound.

The theoretical elementary analysis values of the anhydrous crystalline structure of the copper pyrophosphate compound synthesized in Example 1 included approximately 42.22 wt % of copper, 20.58 wt % of phosphorus, and 37.20 wt % of oxygen. The actual elementary analysis values of the anhydrous crystalline structure of the copper pyrophosphate compound synthesized in Example 1 included approximately 38.96 wt % of copper, 22.84 wt % of phosphorus, 30.10 wt % of oxygen, and other components (FIG. 5). This shows that the basic composition may be changed depending on various factors and variables of the synthesis process. It can be deemed that $Cu_2P_2O_7 \cdot xH_2O$, $Cu_2P_2O_7$, which is the copper pyrophosphate compound of the present invention, may not have quantitative properties, and may have variable values in qualitative and quantitative components.

Figure 6:
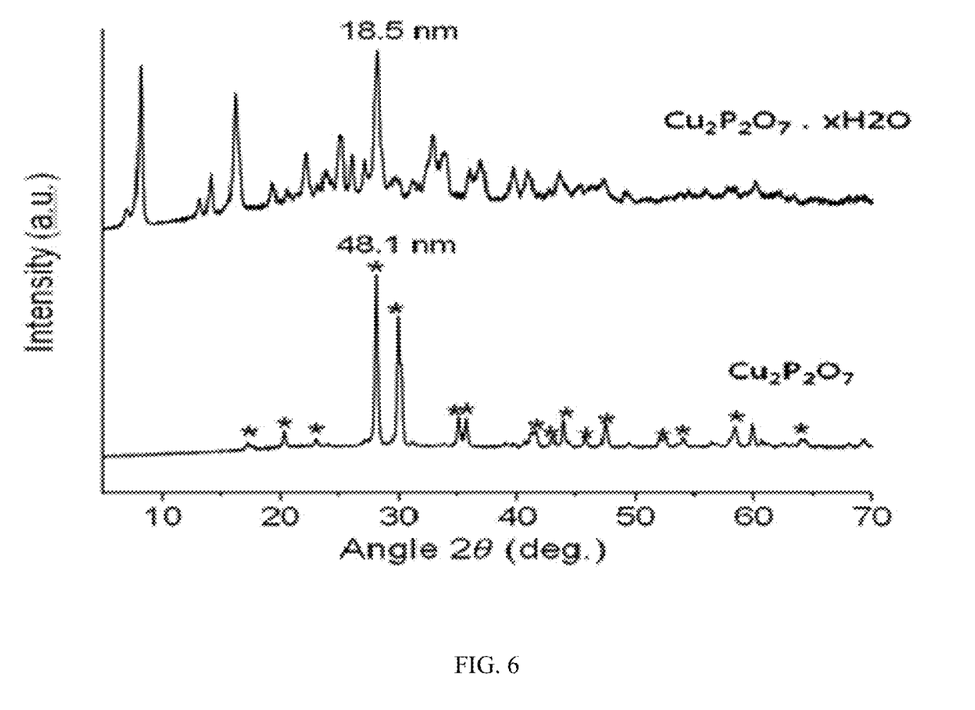
FIG. 6 shows an XRD spectrum of the hydrate structure (upper side) of the copper pyrophosphate compound and the crystallized structure (lower side) thereof, obtained using heat treatment at a high temperature.

The XRD analysis result of the crystalline structures of the hydrate and the anhydride of the copper pyrophosphate compound synthesized in Example 1 showed that the crystalline structure started to be formed (FIG. 6) and that the fine particles started to congeal from a tabular shape to a rod shape when the heat treatment was performed at a temperature of 700° C. or higher.

The heat treatment of the present invention enables the particles to congeal, so that the particle size was reduced, the apparent volume was decreased, and near-infrared absorption was increased. When the heat treatment is performed at 850° C. or higher, the fine particles congeal and aggregate, which makes it difficult to pulverize the particles.

What is claimed is:

1. A near-infrared-absorption white material, comprising:
a copper pyrophosphate compound;
wherein
a brightness of the copper pyrophosphate compound is at least 90 in a visible-ray region;
the copper pyrophosphate compound comprises a crystalline structure, the crystalline structure is made chemically stable using a heat treatment in a temperature range of 750 to 849° C.;
the copper pyrophosphate compound has a particle size of 1 μm; and
the copper pyrophosphate compound is represented by the following chemical formula:

$$Cu_2P_2O_7 \text{ or } Cu_2P_2O_7 \cdot xH_2O \ (x=1\text{-}3).$$

2. The near-infrared-absorption white material of claim 1, wherein the copper pyrophosphate compound comprises a copper compound and a metal pyrophosphate.

3. A method of manufacturing a near-infrared-absorption white material, the method comprising:
manufacturing a supersaturated aqueous solution of a divalent copper compound and a metal pyrophosphate, performing a reaction on the supersaturated aqueous solution at a temperature of 30° C. to 90° C. using a wet synthesis method;

wherein the near-infrared-absorption white material comprises a copper pyrophosphate compound; a brightness of the copper pyrophosphate compound is equal to or more than 90 in a visible-ray region; the copper pyrophosphate compound comprises a crystalline structure, the crystalline structure is made chemically stable using a heat treatment at a temperature of 750 to 849° C.; the copper pyrophosphate compound has a particle size of 1 μm; and the copper pyrophosphate compound is represented by the following chemical formula:

$Cu_2P_2O_7$ or $Cu_2P_2O_7 \cdot xH_2O$ ($x$=1-3).

4. The method of claim 3, wherein in the supersaturated aqueous solution, a reaction mole ratio of the divalent copper compound to the metal pyrophosphate is in a range of 1:1.1 to 1.1:1.

5. The method of claim 3, wherein the method further comprises steps of:
filtering a white precipitate generated after a completion of the reaction on the supersaturated aqueous solution of the divalent copper compound and the metal pyrophosphate,
washing the white precipitate so as to ensure neutrality and to obtain a resultant matter,
re-dispersing the resultant matter in water to obtain a resultant solution,
heating and performing an acid treatment on the resultant solution;
an acid treatment agent is one of a hydrochloric acid, a phosphoric acid, a sulfuric acid, an acetic acid or a mixture of the hydrochloric acid, the phosphoric acid, the sulfuric acid, and the acetic acid; and
the acid treatment is performed at a pH of 1 to 4.

6. The near-infrared-absorption white material of claim 1, wherein the copper pyrophosphate compound has a hydrate structure in a drying state at a temperature of about 100° C., the copper pyrophosphate compound has an anhydride structure at a temperature of around 200 to 400° C., and the copper pyrophosphate compound has a crystalline structure at a temperature of equal to or higher than 700° C.

7. The near-infrared-absorption white material of claim 1, wherein in the chemical formula, a compositional ratio of copper, phosphoric acid, and oxygen is 1.7 to 2.3:1.7 to 2.3:6 to 8 determined by variables including synthesis and reaction conditions and a high-temperature heat treatment process.

8. The near-infrared-absorption white material of claim 1, wherein plastic products, paper products, and fiber products comprising the near-infrared-absorption white material are marked and welded by a laser using an apparatus having a wavelength of 1064 nm in a near-infrared region.

9. The near-infrared-absorption white material of claim 2, wherein the copper compound comprises anhydrides of divalent copper sulfates, copper chlorides, copper nitrates, copper phosphates, or copper acetates; hydrates of divalent copper sulfates, copper chlorides, copper nitrates, copper phosphates, or copper acetates; or a mixture of the anhydrides of divalent copper sulfates, copper chlorides, copper nitrates, copper phosphates, or copper acetates and the hydrates of divalent copper sulfates, copper chlorides, copper nitrates, copper phosphates, or copper acetates.

10. The near-infrared-absorption white material of claim 2, wherein the copper compound comprises anhydrides of tetrasodium pyrophosphate and tetrapotassium pyrophosphate; hydrates of tetrasodium pyrophosphate and tetrapotassium pyrophosphate; or a mixture of the anhydrides of tetrasodium pyrophosphate and tetrapotassium pyrophosphate and the hydrates of tetrasodium pyrophosphate and tetrapotassium pyrophosphate.

* * * * *